(12) United States Patent
Jannyavula Venkata

(10) Patent No.: US 12,361,144 B2
(45) Date of Patent: *Jul. 15, 2025

(54) METHODS AND APPARATUS FOR OFFLOADING ENCRYPTION

(71) Applicant: Samsung Electronics Co., Ltd., Suwon-si (KR)

(72) Inventor: Sumanth Jannyavula Venkata, Fremont, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,942

(22) Filed: Feb. 13, 2024

(65) Prior Publication Data
US 2024/0184899 A1 Jun. 6, 2024

Related U.S. Application Data

(63) Continuation of application No. 18/079,863, filed on Dec. 12, 2022, now Pat. No. 11,934,542, which is a
(Continued)

(51) Int. Cl.
G06F 21/60 (2013.01)
G06F 13/40 (2006.01)
H04L 9/32 (2006.01)

(52) U.S. Cl.
CPC ........ G06F 21/602 (2013.01); G06F 13/4027 (2013.01); H04L 9/32 (2013.01)

(58) Field of Classification Search
CPC .... G06F 21/602; G06F 13/4027; G06F 21/33; G06F 13/4282; G06F 21/606;
(Continued)

(56) References Cited

U.S. PATENT DOCUMENTS

| 7,194,627 B2 | 3/2007 | Cheung et al. |
| 7,496,695 B2 | 2/2009 | Go et al. |

(Continued)

FOREIGN PATENT DOCUMENTS

| CN | 106688217 A | 5/2017 |
| TW | 200731080 A | 8/2007 |
| TW | 200811658 A | 3/2008 |

OTHER PUBLICATIONS

Final Office Action for U.S. Appl. No. 16/856,003, mailed Mar. 8, 2022.
(Continued)

*Primary Examiner* — Abiy Getachew
(74) *Attorney, Agent, or Firm* — Renaissance IP Law Group LLP

(57) ABSTRACT

A method may include transferring data from a host to an encryption offload engine through an interconnect fabric, encrypting the data from the host at the encryption offload engine, and transferring the encrypted data from the encryption offload engine to a storage device through a peer-to-peer connection in the interconnect fabric. The method may further include transferring the encrypted data from the storage device to the encryption offload engine through a peer-to-peer connection in the interconnect fabric, decrypting the encrypted data from the storage device at the encryption offload engine, and transferring the decrypted data to the host through the interconnect fabric. The method may further include transferring the encrypted data from the storage device to the host, and verifying the encryption of the encrypted data at the host.

20 Claims, 8 Drawing Sheets

Related U.S. Application Data continuation of application No. 16/856,003, filed on Apr. 22, 2020, now Pat. No. 11,526,618.

(60) Provisional application No. 62/967,571, filed on Jan. 29, 2020.

(58) Field of Classification Search
CPC .. G06F 21/85; G06F 2213/0026; G06F 21/72; H04L 9/32; H04L 9/0897; H04L 9/3234; H04L 63/0428; H04L 67/104
See application file for complete search history.

(56) References Cited

U.S. PATENT DOCUMENTS

| | | | |
|---|---|---|---|
| 7,712,098 B2* | 5/2010 | Chauvel | G06F 12/1036 711/202 |
| 8,972,733 B1* | 3/2015 | Wu | H04L 9/40 713/171 |
| 9,069,703 B2 | 6/2015 | Raam | |
| 9,195,858 B2 | 11/2015 | Trantham | |
| 9,304,690 B2 | 4/2016 | McCambridge et al. | |
| 9,489,542 B2 | 11/2016 | Miller et al. | |
| 11,269,670 B2 | 3/2022 | Chou et al. | |
| 2007/0073922 A1 | 3/2007 | Go et al. | |
| 2008/0240432 A1 | 10/2008 | Belgaied et al. | |
| 2009/0316899 A1 | 12/2009 | Kim et al. | |
| 2016/0308995 A1* | 10/2016 | Youdale | H04W 48/02 |
| 2016/0357979 A1 | 12/2016 | Paris et al. | |
| 2019/0317802 A1* | 10/2019 | Bachmutsky | G06F 9/5044 |
| 2022/0116205 A1 | 4/2022 | Lee et al. | |

OTHER PUBLICATIONS

Notice of Allowance for U.S. Appl. No. 16/856,003, mailed Aug. 10, 2022.
Notice of Allowance for U.S. Appl. No. 18/079,863, mailed Oct. 27, 2023.
Office Action for U.S. Appl. No. 16/856,003, mailed Sep. 2, 2021.
Office Action for U.S. Appl. No. 18/079,863, mailed Apr. 25, 2023.

* cited by examiner

METHODS AND APPARATUS FOR OFFLOADING ENCRYPTION

CROSS-REFERENCE TO RELATED APPLICATIONS

This application is a continuation of U.S. patent application Ser. No. 18/079,863, filed Dec. 12, 2022, which is a continuation of U.S. patent application Ser. No. 16/856,003, filed Apr. 22, 2020, now U.S. Pat. No. 11,526,618, issued Dec. 13, 2022, which claims priority to, and the benefit of, U.S. Provisional Patent Application Ser. No. 62/967,571 filed Jan. 29, 2020, all of which are incorporated by reference in their entirety.

BACKGROUND

1. Field

This disclosure relates generally to encryption and specifically to offloading encryption through an interconnect fabric.

2. Related Art

A self-encrypting drive (SED) is a type of storage device such as a hard disk drive (HDD) or solid state drive (SSD) that may use internal encryption to prevent unauthorized access of data stored on the device. An SED may include dedicated hardware to accelerate the encryption and decryption process so that it does not slow down the access speed of the drive. An SED may be configured so that data is automatically and continuously encrypted when data is written to the drive, and decrypted when data is read from the drive, without any intervention by the user or the operating system. The acceleration hardware may encrypt and decrypt the data using one or more encryption keys that may be maintained internally on the drive. An SED may require the entry of an additional authentication key each time the drive is restarted to prevent unauthorized access of data if the drive is removed from the host system. Depending on the implementation, the authentication key may be entered into the SED manually by a user, or automatically by a basic input/output system (BIOS) or an operating system, during a boot process.

SUMMARY

A method may include transferring data from a host to an encryption offload engine through an interconnect fabric, encrypting the data from the host at the encryption offload engine, and transferring the encrypted data from the encryption offload engine to a storage device through a peer-to-peer connection in the interconnect fabric. The method may further include transferring the encrypted data from the storage device to the encryption offload engine through a peer-to-peer connection in the interconnect fabric, decrypting the encrypted data from the storage device at the encryption offload engine, and transferring the decrypted data to the host through the interconnect fabric. The method may further include transferring the encrypted data from the storage device to the host, and verifying the encryption of the encrypted data at the host. The data from the host may have a source address, and the method may further include mapping the source address to the encryption offload engine. The storage device may initiate a peer-to-peer transfer from the encryption offload engine to the storage device in response to a write command from the host, and the encryption offload engine may fetch the data from the host using a mapping table. The data to be sent to the host may have a destination address, and the method may further include mapping the destination address to the encryption offload engine. The storage device may initiate a peer-to-peer transfer from the encryption offload engine to the storage device in response to a read command from the host, and the encryption offload engine may transfer the decrypted data to the host using a mapping table.

A system may include a host, an encryption offload engine, and an interconnect fabric arranged to interconnect the host, the encryption offload engine, and one or more storage devices, wherein the encryption offload engine may be configured to receive data from the host, encrypt the data received from the host, and send the encrypted data to at least one of the storage devices through a peer-to-peer connection in the interconnect fabric. The host may be configured to read the encrypted data from the at least one storage device, and verify the encryption of the encrypted data. The host may be configured to read the encrypted data from the at least one storage device by bypassing a mapping table in the encryption offload engine. The system may further include a submission queue configured to hold a write command from the host, and the write command may include a source address for data to be written to the at least one storage device. The host may be configured to map the source address to the encryption offload engine. The encryption offload engine may be configured to maintain a mapping table to map data for a peer-to-peer transfer with the at least one storage device to an address in the host. The peer-to-peer transfer may be associated with a write command from the host. The at least one storage device may be configured to initiate a peer-to-peer transfer from the encryption offload engine in response to the write command from the host, and the encryption offload engine may be configured to receive the data from the host, encrypt the data received from the host, and send the encrypted data to the at least one storage device in response to the at least one storage device initiating the peer-to-peer transfer. The encryption offload engine may be further configured to receive encrypted data from at least one of the storage devices through the peer-to-peer connection in the interconnect fabric, decrypt the encrypted data received from the at least one storage device, and send the decrypted data to the host. The system may further include a submission queue configured to hold a read command from the host, and the read command may include a destination address for the decrypted data from the at least one storage device. The host may be configured to map the destination address to the encryption offload engine.

An encryption device may include an interface configured to couple the encryption device to an interconnect system having peer-to-peer capabilities, and a controller coupled to the interface and configured to receive data from a host through the interface, encrypt the data received from the host, and send the encrypted data to a storage device through the interface. The controller may be further configured to receive encrypted data from the storage device through the interface, decrypt the data received from the storage device, and send the decrypted data to the host through the interface.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

In some embodiments according to this disclosure, data may be transferred from a host to an encryption offload engine through an interconnect fabric. The encryption offload engine may encrypt the data and transfer the encrypted data to a storage device through a peer-to-peer (P2P) connection in the interconnect fabric. Depending on the implementation details, this may improve performance and security by enabling a host to offload encryption calculations without having to trust a self-encrypting drive (SED). During a verify operation, the host may bypass the encryption offload engine and read the encrypted data directly from the storage device to confirm that it was encrypted correctly.

Figure 1:
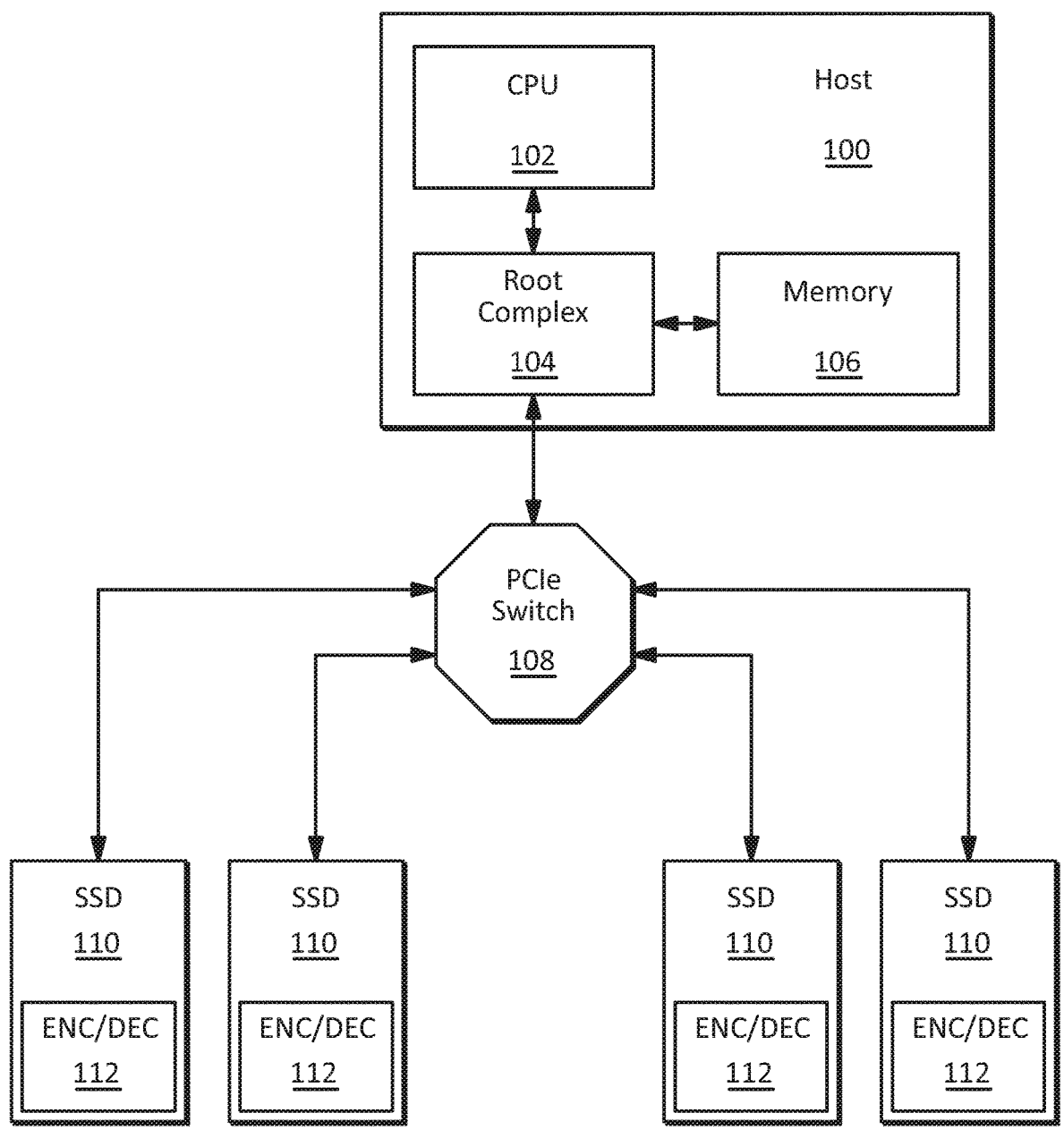
FIG. 1 illustrates the architecture of a system for storing data on self-encrypting drives (SEDs).

FIG. 1 illustrates the architecture of a system for storing data at SEDs. The system illustrated in FIG. 1 may include a host 100 having a central processing unit (CPU) 102 that may be coupled to, or integral with, a Peripheral Component Interconnect Express (PCIe) root complex 104. System memory 106 may be coupled to the CPU 102, for example, through the root complex 104. A PCIe switch 108 may be coupled to, or integral with, the root complex 104. The PCIe 108 switch may be arranged to couple any number of solid state drives (SSDs) 110 to the root complex 104. Each of the SSDs 110 may have internal encryption/decryption hardware 112 to enable the drive to operate as an SED. The PCIe switch 108, and any PCIe interconnects thereto, may be referred to collectively as the PCIe fabric. The system illustrated in FIG. 1 may implement a Non-Volatile Memory Express (NVMe) protocol to enable high-speed data transfers between the SSDs 110 and the host 100 over the PCIe fabric.

A self-encrypting storage operation may begin when a user, an application, a driver, a kernel, and/or the like, at the host 100 sends unencrypted (i.e., clear or plaintext) data to one of the SSDs 110 over the PCIe fabric. Upon arrival at the SSD 110, the encryption/decryption hardware 112 may encrypt the data from the host using one or more encryption keys that may reside in the SSD 110. The encrypted data may then be stored in a solid state storage media such as one or more flash memory devices.

Upon receiving a read command from the host, any of the SSDs 110 may retrieve the encrypted version of the requested data from its storage media. The encrypted data may then be decrypted by the encryption/decryption hardware 112 using the one or more encryption keys that may reside in the SSD 110. The decrypted data may then be transferred to the host 100 through the PCIe fabric.

The architecture and operation as described above with respect to FIG. 1 may enable encryption and decryption to be performed in real time at PCIe bus speeds without slowing down the reading and/or writing of data to the SSDs 110. However, this architecture and/or operation may have one or more potential security problems. For example, in some systems, unencrypted data may be transferred from the SSDs 110 to the host 100, and therefore, the host may not be able to verify that the encrypted (ciphertext) data stored on the storage media in the SSDs 110 has been encrypted correctly.

Some SEDs may provide a verification mechanism to enable a host to access the ciphertext data as it is stored in the storage media. These verification mechanisms, however, may be difficult to utilize because each SED manufacturer may implement a different proprietary solution for accessing the encrypted data. Moreover, even after gaining access to the stored ciphertext, to verify that the encryption was performed correctly, the host may also need to obtain the encryption key or keys used during the encryption process from the SED. However, obtaining the encryption key or keys may be difficult because the SED may wrap the encryption key or keys, for example, using a hardware root of trust with an application specific integrated circuit (ASIC) in a controller for the SED.

A further potential problem with a system such as that illustrated in FIG. 1 is that, because each SED may need to support the management of one or more encryption keys, there may be a potential for key escrow operations in one or more of the SEDs, for example, in a system on chip (SOC) in a controller for the SED. This may provide additional opportunities for encryption keys to be compromised.

Yet another potential problem with a system such as that illustrated in FIG. 1 is that, in some implementations, the SSDs 110 may be located at relatively long distances from the host 100 within a chassis, rack, data center, and/or the like. Since unencrypted data may have to traverse these longer distances, it may provide additional opportunities for the data to be intercepted by an unauthorized entity.

In some systems, data may be encrypted at the host 100 and transferred across the PCIe fabric to the SSDs 110. Thus, the host may not need to trust any of the SSDs 110. Moreover, if any of the data is intercepted by an unauthorized entity within the PCIe fabric, it may already be encrypted. However, performing the encryption and decryption calculations may overload the host CPU and/or reduce the system performance.

Figure 2:
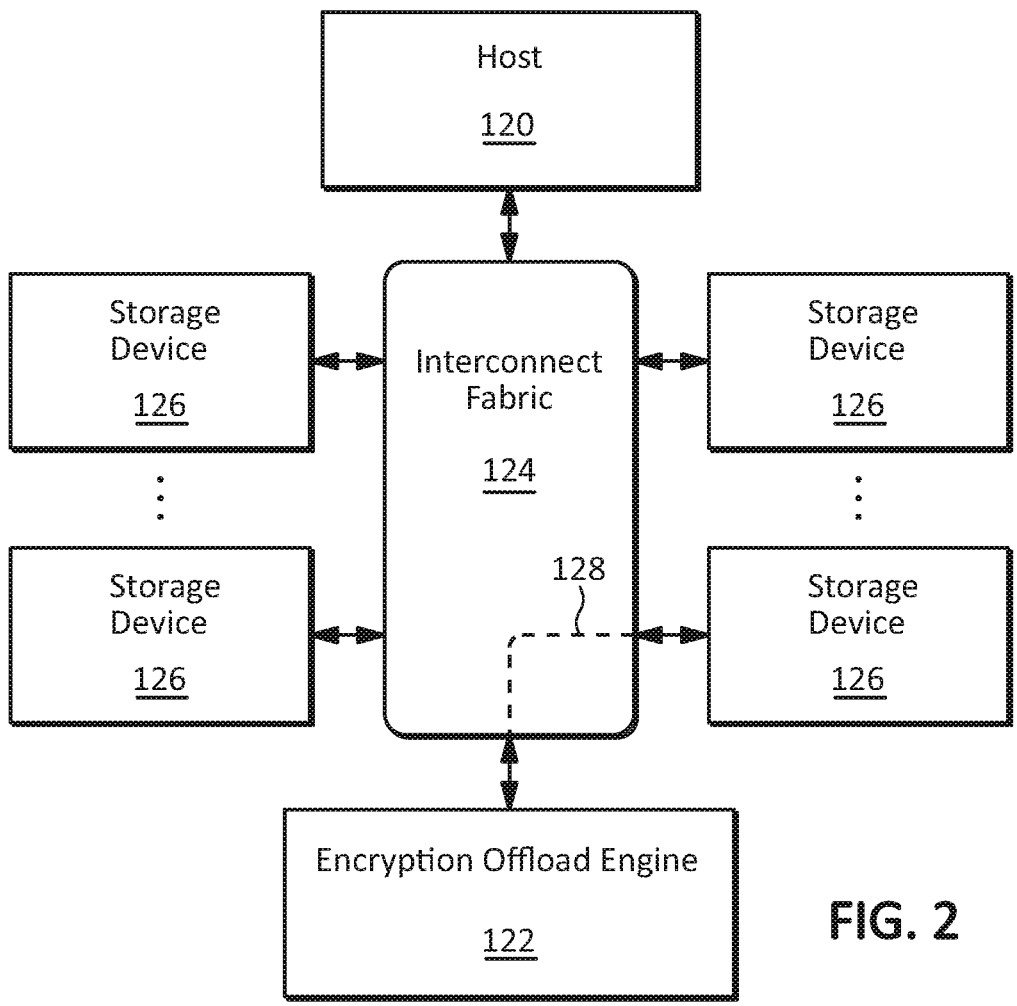
FIG. 2 illustrates an embodiment of a system for providing encrypted data storage according to this disclosure.

FIG. 2 illustrates an embodiment of a system for providing encrypted data storage according to this disclosure. The system illustrated in FIG. 2 may include a host 120, an encryption offload engine 122 and an interconnect fabric 124 arranged to interconnect the host 120, the encryption offload engine 122, and one or more storage devices 126. The interconnect fabric 124 may have peer-to-peer (P2P) capabilities to enable one or more peer-to-peer connections between various devices through the fabric 124.

In some embodiments, during a storage write operation, the encryption offload engine 122 may be configured to receive unencrypted data from the host 120, encrypt the data received from the host, and send the encrypted data to one of the storage devices 126, for example, through a peer-to-peer connection 128 in the interconnect fabric 124. The storage device 126 may store the encrypted data in storage media within the device.

In some embodiments, during a storage read operation, the storage device 126 may retrieve the encrypted data from the storage media within the device, and send the encrypted data to the encryption offload engine 122, for example, through the same or a different peer-to-peer connection 128 in the interconnect fabric 124. The encryption offload engine 122 may then decrypt the encrypted data received from the storage device 126, and send the decrypted data back to the host through the interconnect fabric 124.

In some embodiments, during a verify operation, the storage device 126 may retrieve the encrypted data from the storage media within the device and send the encrypted data to the host 120, thus bypassing the encryption offload engine 122. The host may then verify that the encrypted data stored at the storage device 126 was encrypted correctly.

Thus, depending on the implementation details, the system illustrated in FIG. 2 may address some or all of the security and/or performance concerns discussed above. For example, because the encryption and decryption for write and read operations, respectively, may be decoupled from the host 120, the encryption/decryption burden on the host may be reduced or eliminated, and/or system performance may be improved.

As another example, because the encryption and/or decryption and/or verification may be performed independently of the storage devices 126, the storage devices may read and/or write data that is already encrypted. This may reduce or eliminate the need to use any built-in verification mechanisms that may exist in the storage devices 126 to gain access to the encrypted (ciphertext) data as it is stored in the storage media. This may streamline the design process and/or operation of the system and/or reduce or eliminate the need to accommodate different proprietary verification mechanisms that may be implemented by different storage device manufacturers. Moreover, performing encryption and/or decryption and/or verification independently of the storage devices 126 may reduce or eliminate the need to obtain the encryption key or keys used during an encryption process by the storage device 126.

As a further example, performing encryption and/or decryption and/or verification independently of the storage devices 126 may reduce or eliminate concerns about the potential for key escrow operations in one or more of the storage devices 126.

As yet another example, in some embodiments, the encryption offload engine 122 may be located relatively close to the host 120. Thus, unencrypted data may only need to traverse a relatively short distance through the interconnect fabric 124 between the host 120 and the encryption offload engine 122. In contrast, if any of the storage devices 126 are located at relatively long distances from the host and/or encryption offload engine 122, the data that may need to traverse these longer distances may have been encrypted already by the encryption offload engine 122, thereby reducing the risk of compromising the data if it is intercepted by an unauthorized entity.

Referring again to FIG. 2, the interconnect fabric 124 may be implemented with any suitable interconnect media, apparatus, protocols, combinations thereof, and/or the like. For example, in some embodiments, the interconnect fabric may be implemented using the Non-Volatile Memory Express (NVMe) protocol over Peripheral Component Interconnect Express (PCIe) links. In such PCIe/NVMe embodiments, the interconnect fabric may include any number and/or combination of PCIe switches, bridges, retimers, links, lanes, and the like, which may be arranged in any topology and configured to transfer data through any arrangement and/or combination of hierarchical (tree) and/or peer-to-peer connections through the interconnect fabric 124. In such PCIe/NVMe embodiments, data transfers may be initiated using submission queues (SQs) that may be maintained at one or more locations throughout the system. For example, in some embodiments, one or more submission queues may be maintained in memory provided by the host 120 and/or one or more of the storage devices 126.

In other embodiments, however, the interconnect fabric 124 may be implemented with any other suitable interconnect media, apparatus, protocols, combinations thereof, and/or the like. Examples may include Peripheral Component Interconnect (PCI), AT Attachment (ATA), Serial ATA (SATA), Small Computer System Interface (SCSI), Serial Attached SCSI (SAS), Ethernet, Fibre Channel, InfiniBand, OCuLink, NVMe over Fabric (NVMe-oF), and others. The interconnect fabric may be capable of providing peer-to-peer connections and/or communications between components. The interconnect fabric may be implemented with segments having different interconnect media, apparatus, protocols, combinations thereof, and/or the like, and the various segments may include any combination of bridges, translators, switches, hubs, cables, traces, connectors, and/or the like, arranged in any topology and connected between and/or within segments.

The encryption offload engine 122 may be implemented with hardware, software, firmware and/or any combination thereof. In some embodiments, the encryption offload engine 122 may be implemented as a separate component, for example, as an add-in card or module that may be interfaced to the interconnect fabric 124 by plugging it in to a PCI slot, PCIe slot, M.2 slot, U.2 connector, SATA connector, SAS connector, OCuLink connector, or other slot or connector on a motherboard, backplane, midplane, module, combinations thereof, and/or the like. In some other embodiments, it may be implemented as a module that may be interfaced to the interconnect fabric through a cable and/or connector. In some embodiments, the encryption offload engine 122 may be integrated into another component such as a PCIe switch, root complex, motherboard, add-in or adapter card or module, backplane, midplane, combinations thereof, and/or the like. The encryption offload engine 122 may utilize any suitable encryption/decryption techniques and/or algorithms such as a 128-bit or 256-bit Advanced Encryption Standard (AES) algorithm using symmetric and/or asymmetric encryption and/or authentication keys or any combination thereof.

The host 120 may be implemented with any device(s) and/or system(s) that may need to store data in an encrypted format. Examples may include one or more CPUs on one or more motherboards in a server, server rack, desktop or laptop computer, mobile device, Internet-of-Things (IOT) device, combinations thereof, and/or the like.

The storage devices 126 may be implemented with hard disk drives (HDDs), solid state drives (SSDs), hybrid drives, combinations thereof, and/or the like, based on any storage media including magnetic media, flash memory devices, persistent memory devices, combinations thereof, and/or the like, in any form factor including 3.5 inch, 2.5 inch, M.2, U.2, Next Generation Small Form Factor (NGSFF), combinations thereof, and/or the like, and using any interface media, apparatus, protocols, combinations thereof, and/or the like.

Figure 3:
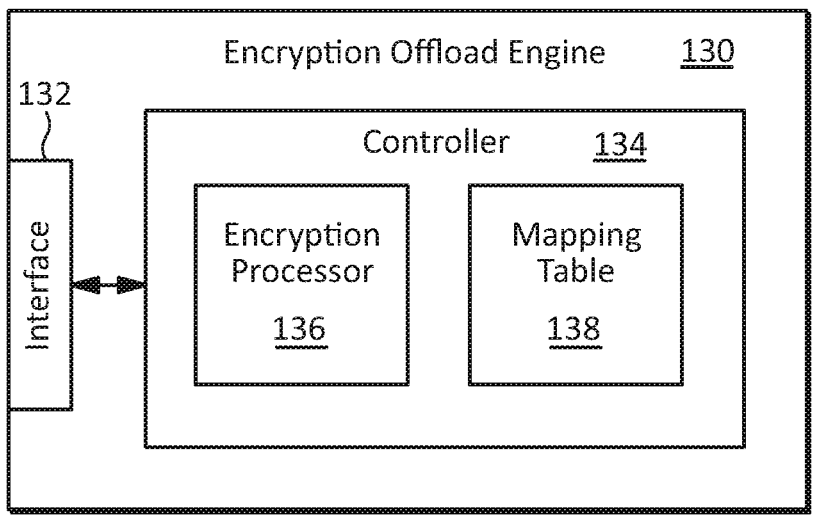
FIG. 3 illustrates an example embodiment of an encryption offload engine according to this disclosure.

FIG. 3 illustrates an example embodiment of an encryption offload engine according to this disclosure. In the embodiment illustrated in FIG. 3, the encryption offload engine 130 may include an interface 132 configured to couple the encryption offload engine 130 to other components such as a host and/or storage devices through an interconnect fabric. The interface 132 may be capable of implementing peer-to-peer connections and/or communications between the encryption offload engine 130 and one or more other components through the interconnect fabric. The encryption offload engine 130 may also include a controller 134 that may be coupled to the interface 132 and may include an encryption processor 136. The controller 134 may be configured to receive data from a host through the interface 132, encrypt the data received from the host using the encryption processor 136, and send the encrypted data to a storage device through the interface. The controller 134 may also be configured to receive encrypted data from a storage device through the interface 132, decrypt the data received from the storage device using the encryption processor 136, and send the decrypted data to the host through the interface 132.

In some embodiments, the controller 134 may also include a mapping table 138 that may be used, for example, to determine a source and/or destination location for unencrypted (plaintext) data within a host.

An encryption operation in the encryption offload engine 130 may be initiated in various manners according to the principles of this disclosure. For example, in some embodiments, an encryption operation may be initiated when a storage device initiates a peer-to-peer data transfer from the encryption offload engine 130 to the storage device by sending a peer-to-peer request to the encryption offload engine 130. (The peer-to-peer request from the storage device may have been prompted by a command it received from, for example, a host.) Upon receiving a data transfer request from a storage device, the controller 134 in the encryption offload engine 130 may use source information it may have received from the storage device and/or information in the mapping table 138 to request unencrypted data from a data source address in a host. Upon receiving the unencrypted data from the host, the controller 134 may encrypt the data received from the host using the encryption processor 136, and send the encrypted data to a storage device through the interface 132, thereby completing the peer-to-peer transfer requested by the storage device.

In some other embodiments, an encryption operation in the encryption offload engine 130 may be initiated directly by a host which may send a command to the encryption offload engine 130 instructing the encryption offload engine 130 to encrypt data from the host and send the encrypted data to a storage device. In such an embodiment, a peer-to-peer transfer of encrypted data from the encryption offload engine 130 to a storage device may be initiated by the encryption offload engine 130.

Similarly, a decryption operation in the encryption offload engine 130 may be initiated in various manners according to the principles of this disclosure. For example, in some embodiments, a decryption operation may be initiated when a storage device initiates a peer-to-peer data transfer by sending encrypted data to the encryption offload engine 130. (The peer-to-peer transfer from the storage device may have been prompted by a command it received from, for example, a host.) Upon receiving encrypted data from a storage device, the controller 134 in the encryption offload engine 130 may use the encryption processor 136 to decrypt the data. The controller 134 may then transfer the decrypted data to the host using destination information it may have received from the storage device and/or information contained in the mapping table 138 to transfer the decrypted data to a destination location in the host.

In some other embodiments, a decryption operation in the encryption offload engine 130 may be initiated directly by a host which may send a command to the encryption offload engine 130 instructing it to request encrypted data to a specific storage device, decrypt the encrypted data, and transfer the decrypted data to the host. In such an embodiment, a peer-to-peer transfer of encrypted data from a storage device to the encryption offload engine 130 may be initiated by the encryption offload engine 130.

In some embodiments, the encryption offload engine 130 may not participate in a verification operation because the purpose may be to confirm the correctness and/or integrity of the encryption/decryption operations. However, to facilitate a verification operation, a host may request a copy of the encryption key or keys from the encryption offload engine 130.

The controller 134 may also implement one or more authentication processes. For example, the controller may require the entry of an authentication key by a host or hosts each time the encryption offload engine 130 is restarted, initialized, reconfigured, and/or the like. Depending on the implementation details, the authentication key may be entered into the encryption offload engine 130 manually by a user through a host, or automatically by a basic input/output system (BIOS) or an operating system on a host, for example, during a boot process.

As with the embodiment of an encryption offload engine 122 illustrated in FIG. 2, the embodiment illustrated in FIG. 3 may be implemented with hardware, software, firmware and/or any combination thereof. It may use one or more interfaces for any interconnect media, apparatus, protocols, combinations thereof, and/or the like. It may be realized in any form factor as a separate component or integrated into one or more other components. It may utilize any encryption/decryption techniques and/or algorithms, combinations thereof, and/or the like. The interface 132 may include any number of ports for the same or different interconnect fabric.

Figure 4:
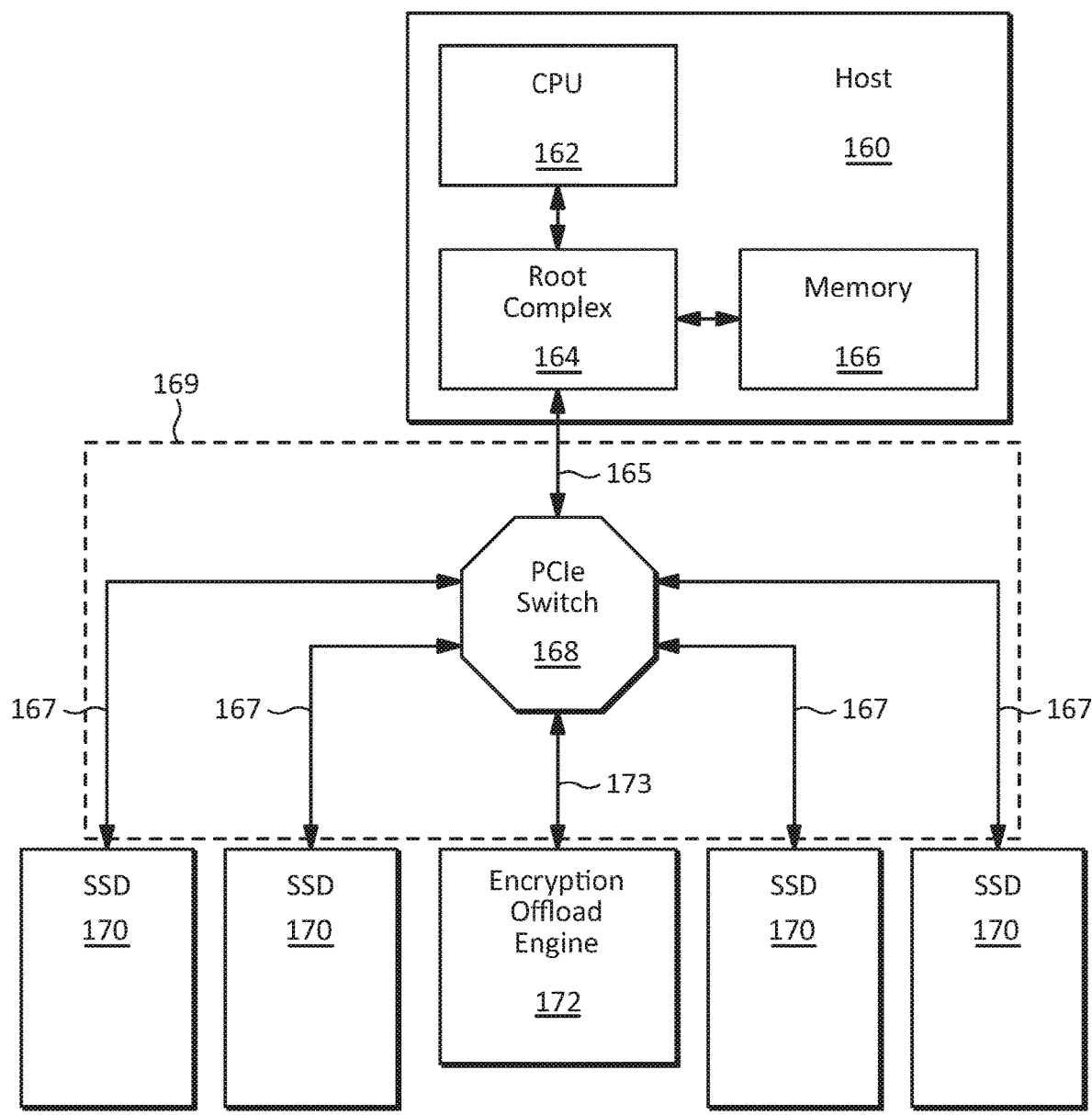
FIG. 4 illustrates an example embodiment of a system for providing encrypted data storage according to this disclosure.

FIG. 4 illustrates an example embodiment of a system for providing encrypted data storage according to this disclosure. For purposes of illustration, the embodiment illustrated in FIG. 4 may be described in the context of a system that may implement an NVMe protocol on top of a PCIe interconnect fabric. However, the inventive principles of this disclosure are not limited to these implementation details.

The system illustrated in FIG. 4 may include a host 160 having a central processing unit (CPU) 162 that may be coupled to, or integral with, a PCIe root complex 164. System memory 166 may be coupled to the CPU 162, for example, through the root complex 164. A PCIe switch 168 may be integral with the root complex 164, or coupled to the root complex 164 through a PCIe link 165. The PCIe 168 switch may be arranged to couple any number of solid state drives (SSDs) 170 to the root complex 164 through PCIe links 167. The PCIe switch 168, and any PCIe interconnects or links thereto, may be referred to collectively as the PCIe fabric 169. The PCIe root complex 164 may be implemented, for example, as a device that may interface one or more host components to the PCIe switch fabric 169. The PCIe complex 164 may generate and/or supervise transactions between the host and other components attached to the fabric 169, as well as between other components attached to the fabric 169, for example, through P2P transactions. The system may also include an encryption offload engine 172 coupled to the PCIe switch 168 through a PCIe link 173. The encryption offload engine 172 may be implemented, for example, using any of the embodiments described in this disclosure including those illustrated in FIGS. 2, 3, etc. The components of the system illustrated in FIG. 4 may implement an NVMe protocol to enable high-speed data transfers between the host 160, the encryption offload engine 172, and/or the SSDs 170 over the PCIe fabric. Any of the PCIe links may be implemented with any number of lanes to accommodate different amounts of data traffic between the various components, and to provide for scalability based on the requirements of the various components. The system may also include one or more additional encryption offload engines to accommodate additional data traffic and/or encryption/decryption workloads as more storage capacity may be added to the system.

Figure 5:
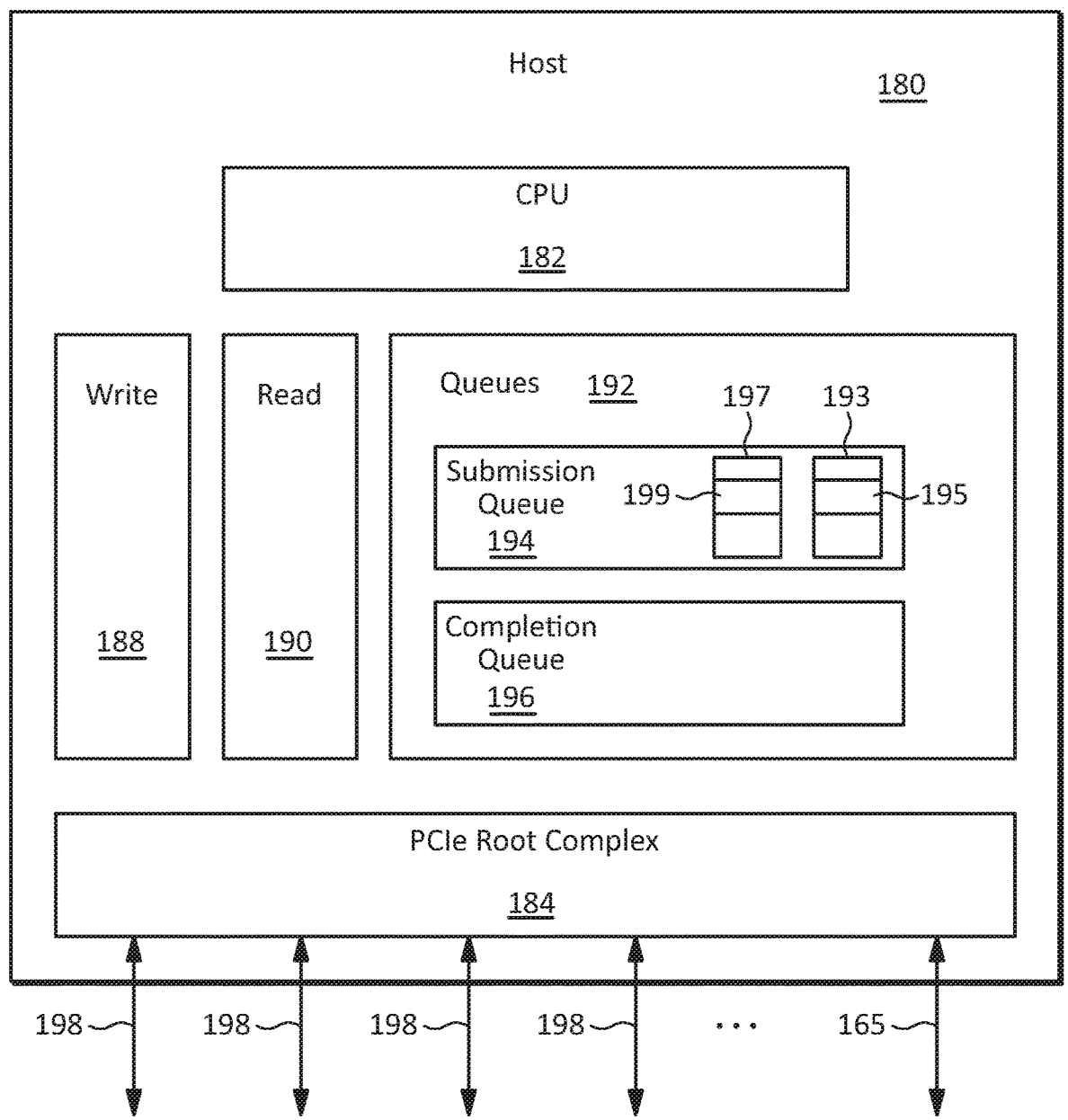
FIG. 5 illustrates an example embodiment of a host system according to this disclosure.

FIG. 5 illustrates an example embodiment of a host system according to this disclosure. The embodiment illustrated in FIG. 5 may be used, for example, to implement the host 160 illustrated in FIG. 4.

Referring to FIG. 5, the host 180 may include a CPU 182, and a PCIe root complex 184. The host may also include system memory that may include a region 188 allocated for write buffers to hold data that is to be written to one or more storage devices, and a region 190 allocated for read buffers to hold data that is read from the storage devices. The system memory may also include another region 192 allocated for queues such as SQ 194 and completion queue 196 which may be used, for example, to facilitate NVMe transactions with storage devices and/or encryption offload engines. The root complex 184 may include any number of PCIe links 198 that may be configured to interface the host to any PCIe devices. If the host 180 is used to implement the host 160 illustrated in FIG. 4. PCIe link 165 may be included to connect the root complex 184 to the PCIe switch 168. In some other embodiments, the switch 168 may be integrated into the root complex 184, and other components such as an encryption offload engine and one or more storage devices may be connected directly to the root complex through links 198.

Figure 6:
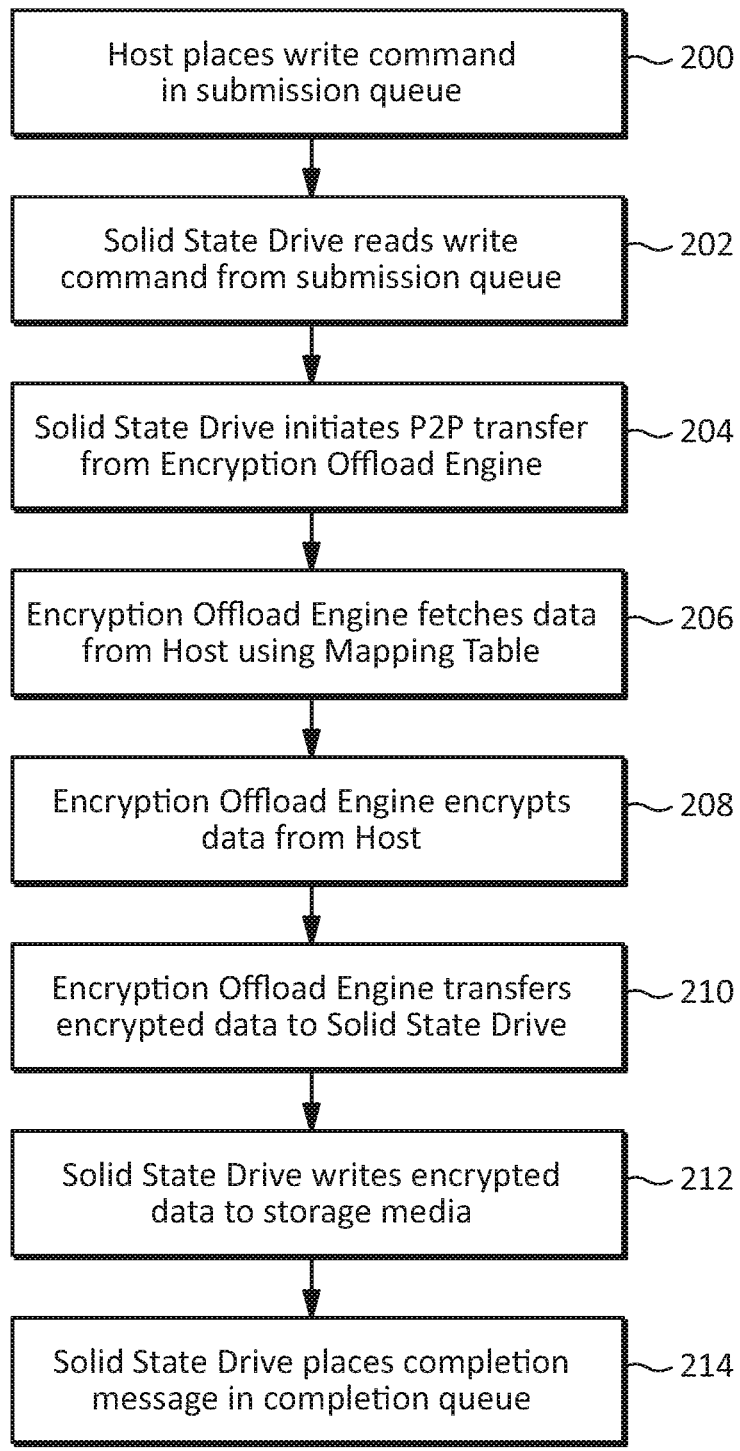
FIG. 6 illustrates an embodiment of a method for storing encrypted data in a storage device according to this disclosure.

FIG. 6 illustrates an embodiment of a method for storing encrypted data in a storage device according to this disclosure. The embodiment of FIG. 6 may be described, for example, in the context of the system illustrated in FIG. 4, where the host 160 may be implemented with the host 180 illustrated in FIG. 5, and the encryption offload engine 172 may be implemented with the encryption offload engine 130 illustrated in FIG. 3. However, the inventive principles of the embodiment illustrated in FIG. 6 are not limited to these or any other implementation details.

Referring to FIG. 6, the method may begin at element 200 where the host 180 may place a write command 193 into the submission queue 194. The write command 193 may include a source address 195 for data that is to be written to an SSD 170. The source address may be in the form of, for example, a Physical Region Page (PRP), a Scatter Gather List (SGL), or any other form. At element 202, the SSD 170 may read the write command 193 including the source address 195 from the submission queue 194. However, rather than mapping the source address to a location in the write buffer 188, the host 180 may map the source address 195 to the encryption offload engine 130. Thus, at element 204, the SSD 170 may initiate a peer-to-peer transfer from the encryption offload engine 130 to the SSD 170 through the PCIe fabric 169. At element 206, the encryption offload engine 130 may use the mapping table 138 to fetch the data from a mapped location in the write buffer 188 in host 180. At element 208, the encryption offload engine 130 may use the encryption processor 136 to encrypt the data from the host. At element 210, the encryption offload engine 130 may transfer the encrypted data to the SSD 170, thereby completing the peer-to-peer transaction. At element 212, the SSD 170 may write the encrypted data to its storage media. At element 214, the SSD 170 may place a completion message in the completion queue 196, thereby signaling the completion of the write operation.

Figure 7:
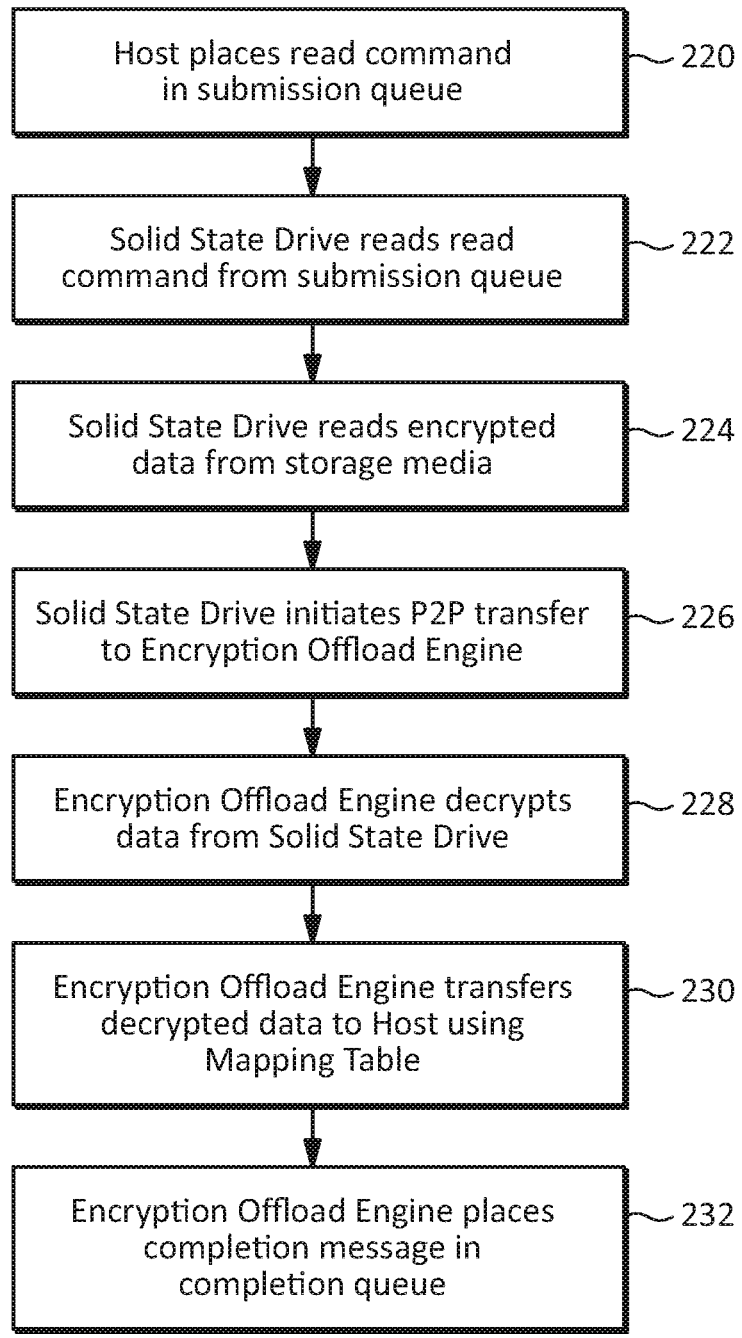
FIG. 7 illustrates an embodiment of a method for reading encrypted data from a storage device according to this disclosure.

FIG. 7 illustrates an embodiment of a method for reading encrypted data from a storage device according to this disclosure. The embodiment of FIG. 7 may be described, for example, in the context of the system illustrated in FIG. 4, where the host 160 may be implemented with the host 180 illustrated in FIG. 5, and the encryption offload engine 172 may be implemented with the encryption offload engine 130 illustrated in FIG. 3. However, the inventive principles of the embodiment illustrated in FIG. 7 are not limited to these or any other implementation details.

Referring to FIG. 7, the method may begin at element 220 where the host 180 may place a read command 197 into the submission queue 194. The read command 197 may include a destination address 199 for data that is to be read from an SSD 170. The destination address may be in the form of, for example, a PRP, an SGL, or any other form. At element 222, the SSD 170 may read the read command 197 including the destination address 199 from the submission queue 194. At element 224, the SSD 170 may read encrypted data from its storage media. However, rather than mapping the destination address 199 to a location in the read buffer 190, the host 180 may map the destination address 199 to the encryption offload engine 130. Thus, at element 226, the SSD 170 may initiate a peer-to-peer transfer in which is sends the encrypted data to the encryption offload engine 130 through the PCIe fabric 169. At element 228, the encryption offload engine 130 may use the encryption processor 136 to decrypt the encrypted data from the SSD 170, thereby completing the peer-to-peer transaction. At element 230, the encryption offload engine 130 may use the mapping table 138 to transfer the decrypted data to a mapped location in the read buffer 190 in host 180. At element 232, the encryption offload engine 130 may place a completion message in the completion queue 196, thereby signaling the completion of the read operation.

Figure 8:
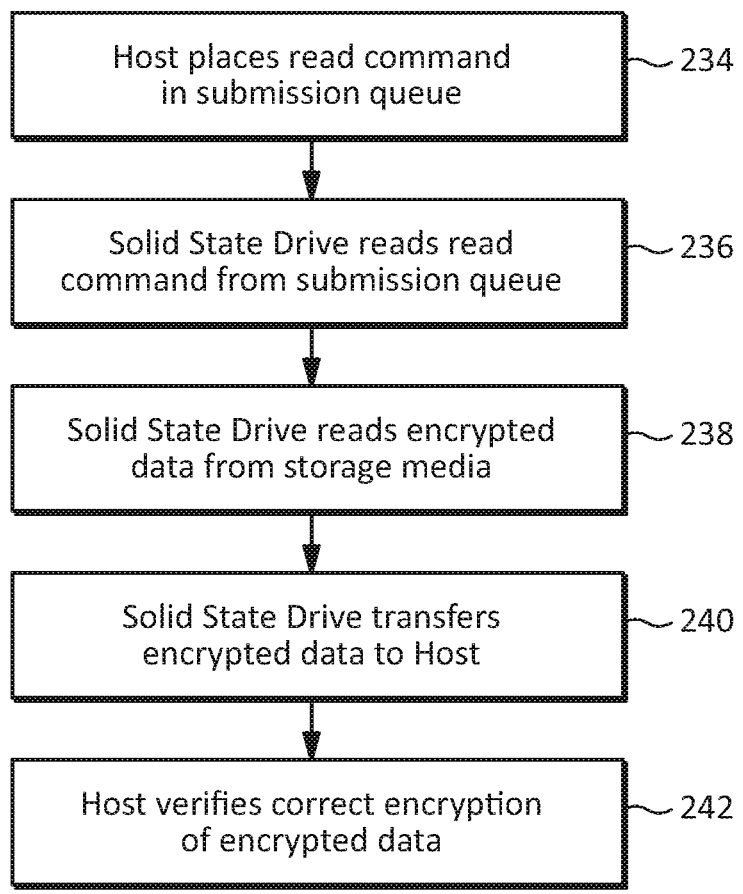
FIG. 8 illustrates an embodiment of a method for verifying encryption of data stored at a storage device according to this disclosure.

FIG. 8 illustrates an embodiment of a method for verifying encryption of data stored at a storage device according to this disclosure. The embodiment of FIG. 8 may be described, for example, in the context of the system illustrated in FIG. 4, where the host 160 may be implemented with the host 180 illustrated in FIG. 5, and the encryption offload engine 172 may be implemented with the encryption offload engine 130 illustrated in FIG. 3. However, the inventive principles of the embodiment illustrated in FIG. 8 are not limited to these or any other implementation details.

Referring to FIG. 8, the method may begin at element 234 where the host 180 may place a read command 197 into the submission queue 194. The read command 197 may include a destination address 199 for data that is to be written to an SSD 170. The destination address may be in the form of, for example, a PRP, an SGL, or any other form. At element 236, the SSD 170 may read the read command 197 including the destination address 199 from the submission queue 194. At element 238, the SSD 170 may read encrypted data from its storage media.

However, during a verify operation, the host 180 may map the destination address 199 directly to a location in the read buffer 190 at the host 180, thereby bypassing the mapping table in the encryption offload engine 130. Thus, at element 240, the SSD 170 may transfer the encrypted (ciphertext) data directly to the host 180 through the PCIe fabric 169. At element 242, the host 180 may perform its own decryption calculations to verify that the data stored in encrypted form at the SSD 170 was encrypted correctly.

In some embodiments, the host 180 may perform its own decryption calculations for verification purposes using a copy of the encryption key or keys that is maintained at the host. In some other embodiments, the host 180 may request a copy of the encryption key or keys from the encryption offload engine 130. In some embodiments, encryption keys may be managed at the encryption management engine 130, at the host 180, at another component, or a combination thereof, using any conventional or customized key management techniques.

In some embodiments, the mapping table 138 may be maintained by the encryption offload engine 130 based on mapping information provided by the host 180. For example, during a restart operation, the host 180 may provide mapping information to enable the encryption offload engine 130 to build an initial mapping table 138, which may be updated periodically based on updated mapping information provided by the host 180.

In some embodiments, data may be encrypted and/or decrypted, transferred to and from storage devices, and/or verified, at a block and/or a sector level. These operations may be performed and/or supervised, for example, by device drivers that may operate transparently to a user, an application, a file system, and/or the like, and or combinations thereof, which may be unaware of the encryption. In some other embodiments, data may be encrypted and/or decrypted, transferred to and from storage devices, and/or verified, at a file level, an object level (for example, with key/value stores), combinations thereof, and/or the like.

Ins some embodiments, an encryption offload engine may operate independently of a host and/or a storage device and manage address translation to maintain an encrypted shadow of plaintext user data.

As described above, and depending on the implementation details, various embodiments according to this disclosure may provide a reliable, flexible, scalable, and/or trustable solution for storing data in an encrypted form in one or more storage devices.

Figure 9:
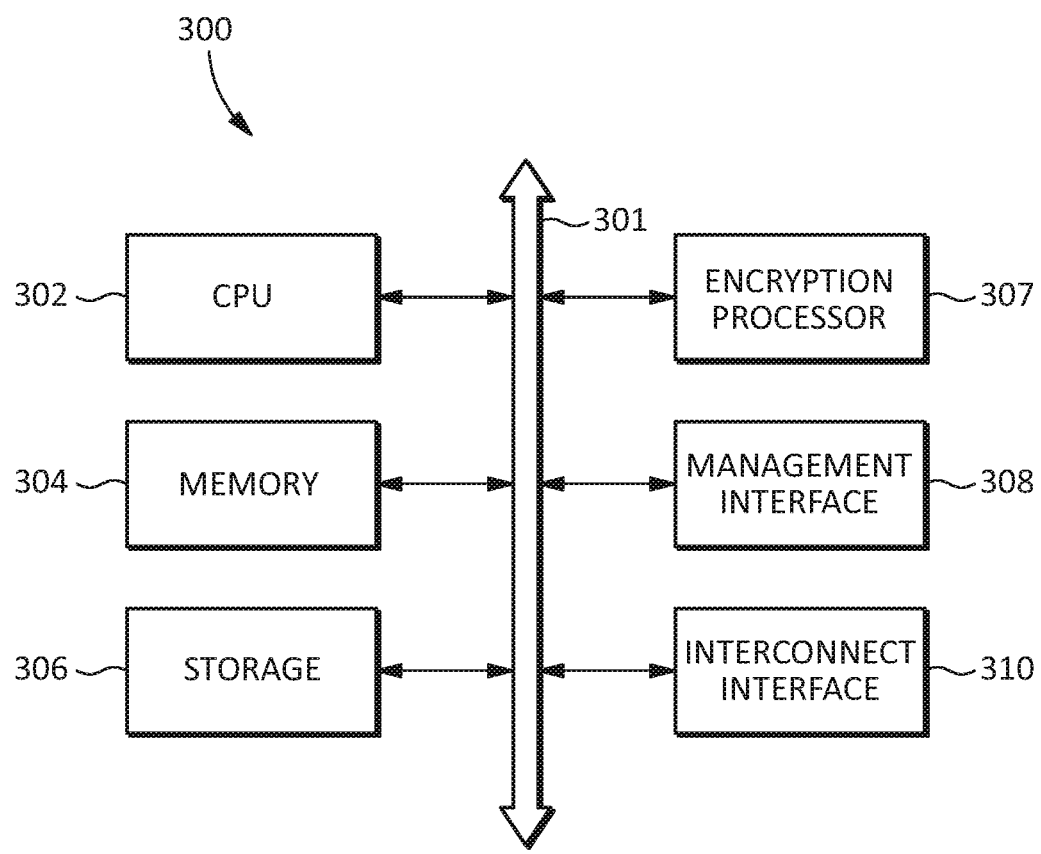
FIG. 9 illustrates an embodiment of an apparatus that may be used to implement a controller for an encryption offload engine according to this disclosure.

FIG. 9 illustrates an embodiment of an apparatus that may be used to implement a controller for an encryption offload engine according to this disclosure. For example, the apparatus 300 illustrated in FIG. 9 may be used to implement the controller 134 illustrated in FIG. 3. The apparatus 300 may include a CPU 302, memory 304, storage 306, an encryption processor 307, a management interface 308, and an interconnect interface 310. By way of example, in some embodiments, all of the functions of an encryption offload engine may be implemented entirely by the CPU 302 using software stored in storage 306 without using any hardware acceleration as may be provided by encryption processor 307. In some other embodiments, encryption and/or decryption may be performed primarily or entirely by encryption processor 307. A mapping table may be stored in memory 304 for short term use while in operation and in storage 306 to prevent loss of the mapping table across power cycles. In different embodiments, any of these components may be omitted or may be include in duplicates, or any additional numbers of, any of the components, as well as any other types of components.

The CPU 302 may include any number of cores, caches, bus, and/or interconnect interfaces and/or controllers. The Memory 304 may include any arrangement of dynamic and/or static RAM, nonvolatile memory (e.g., flash memory) combinations thereof, and/or the like. The storage 306 may include hard disk drives (HDDs), solid state drives (SSDs), and/or any other type of data storage devices and/or any combination thereof. The management interface 308 may include any type of apparatus such as switches, keypads, displays, connectors, combinations thereof, and/or the like, that may enable a user to enter or change authorization codes, update firmware, review event logs, and/or perform any other functions that may be helpful to monitor the operation of the encryption offload engine and/or verify its integrity and trustworthiness. Any or all of the components of the system 300 may be interconnected through a system bus 301 which may collectively refer to various interfaces including power buses, address and data buses, high-speed interconnects such as Serial AT Attachment (SATA), Peripheral Component Interconnect (PCI), Peripheral Component Interconnect Express (PCIe), System Management Bus (SMB), and any other types of interfaces that may enable the components to work together, either locally at one location, and/or distributed between different locations. The system 300 may also include various chipsets, interfaces, adapters, glue logic, embedded controllers, such as programmable or non-programmable logic devices or arrays, application specific integrated circuits (ASICs), systems on chips (SOCs) and the like, arranged to enable the various components of the system 300 to work together to implement any or all of the features and/or functions of an encryption offload engine according to this disclosure.

The embodiments disclosed herein may have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, combinations thereof, and/or the like, but these terms may also encompass embodiments in which a specific process, step, combinations thereof, and/or the like may be implemented with multiple processes, steps, combinations thereof, and/or the like, or in which multiple process, steps, combinations thereof, and/or the like may be integrated into a single process, step, combinations thereof, and/or the like A reference to a component or element may refer to only a portion of the component or element. The use of terms such as "first" and "second" in this disclosure and the claims may only be for purposes of distinguishing the things they modify and may not indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
receiving, by at least one processor, using a first communication connection, data;
transforming the data using the at least one processor to generate transformed data; and
transferring the transformed data from the at least one processor to a device using a second communication connection;
wherein the second communication connection uses a switch connected to the at least one processor and the device.

2. The method of claim 1, further comprising:
transferring the transformed data from the device to the at least one processor using the second communication connection;
modifying the transformed data at the at least one processor to generate modified data; and
transferring the modified data using a communication fabric.

3. The method of claim 1, further comprising:
transferring the transformed data from the device to a host; and
verifying, at the host, the transformed data.

4. The method of claim 1, wherein:
the data comprises a source address; and
the method further comprises associating the source address to the at least one processor.

5. The method of claim 4, wherein:
the at least one processor is configured to obtain the data using a data structure; and
the device is configured to:
receive a write command; and
transfer the transformed data from the at least one processor to the device based on the write command.

6. The method of claim 2, wherein:
the modified data is associated with a destination address; and
the method further comprises associating the destination address to the at least one processor.

7. The method of claim 6, wherein:
the device is configured to:
receive a read command; and
transfer the transformed data from the at least one processor to the device based on the read command; and
the at least one processor is configured to transfer the modified data using a data structure.

8. A system comprising:
a host;
at least one processor; and
a switch configured to be connected to the at least one processor and one or more devices;
wherein the at least one processor is configured to:
receive data from the host using a first communication connection;
transform the data to generate transformed data; and
send the transformed data to the at least one of the one or more devices using a second communication connection, wherein the second communication connection uses the switch.

9. The system of claim 8, wherein the host is configured to:
read the transformed data from the at least one of the one or more devices; and
verify the transformed data.

10. The system of claim 9, wherein the host is configured to:
associate a destination address to the host; and
read, based on the destination address, the transformed data from the at least one of the one or more devices.

11. The system of claim 8, wherein:
the system further comprises a submission queue configured to receive a write command from the host; and
the write command comprises a source address for the transformed data.

12. The system of claim 11, wherein the host is configured to associate the source address to the at least one processor.

13. The system of claim 8, wherein the at least one processor is configured to send the transformed data to the at least one of the one or more devices based on an association.

14. The system of claim 13, wherein the at least one processor is configured to receive the data from the host based on the association.

15. The system of claim 14, wherein the at least one of the one or more devices is configured to receive the transformed data from the at least one processor based on a write command.

16. The system of claim 8, wherein the at least one processor is further configured to:
receive transformed data from at least one of the one or more devices using the second communication connection;
modify the transformed data to generate modified data; and
send the modified data to the host.

17. The system of claim 16, wherein:
the system further comprises a queue configured to hold a read command; and
the read command is associated with a destination address for the modified data.

18. The system of claim 17, wherein the host is configured to associate the destination address to the at least one processor.

19. An apparatus comprising:
a computational device comprising:
an interface configured to couple the computational device to a switch, wherein the switch is connected to a device; and
a controller coupled to the interface and configured to:
receive, using a first connection, data using the interface;
transform the data to generate transformed data; and
send, using a connection, the transformed data to the device using the interface, wherein the connection uses the switch.

20. The apparatus of claim 19, wherein the controller is further configured to:
receive transformed data from the device using the interface;
modify the transformed data to generate modified data; and
send the modified data using the interface.

* * * * *